US012368334B2

(12) United States Patent
Liu et al.

(10) Patent No.: US 12,368,334 B2
(45) Date of Patent: Jul. 22, 2025

(54) ROTOR OF MOTOR, METHOD FOR MAINTAINING ROTOR OF MOTOR, MOTOR AND WIND-POWER ELECTRIC GENERATOR SET

(71) Applicant: XINJIANG GOLDWIND SCIENCE & TECHNOLOGY CO., LTD., Xinjiang (CN)

(72) Inventors: Likun Liu, Beijing (CN); Yanhui Li, Beijing (CN)

(73) Assignee: XINJIANG GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 454 days.

(21) Appl. No.: 17/594,334

(22) PCT Filed: Feb. 7, 2020

(86) PCT No.: PCT/CN2020/074542
§ 371 (c)(1),
(2) Date: Oct. 12, 2021

(87) PCT Pub. No.: WO2020/207107
PCT Pub. Date: Oct. 15, 2020

(65) Prior Publication Data
US 2022/0200381 A1 Jun. 23, 2022

(30) Foreign Application Priority Data
Apr. 12, 2019 (CN) .......................... 201910293934.1

(51) Int. Cl.
*H02K 1/2791* (2022.01)
*H02K 7/14* (2006.01)

(52) U.S. Cl.
CPC ............. *H02K 1/2791* (2022.01); *H02K 7/14* (2013.01); *H02K 2213/12* (2013.01)

(58) Field of Classification Search
CPC ........ H02K 1/27; H02K 1/2706; H02K 1/272; H02K 1/2726; H02K 1/2733; H02K 1/274;
(Continued)

(56) References Cited

U.S. PATENT DOCUMENTS 3,046,426 A * 7/1962 Gynt ........................ H02K 1/30
310/265
4,110,652 A * 8/1978 McGahern ............... H02K 1/30
310/422
(Continued)

FOREIGN PATENT DOCUMENTS

CN 201536286 U 7/2010
CN 102163900 A 8/2011
(Continued)

OTHER PUBLICATIONS

U.S. Appl. No. 17/594,334, filed Apr. 15, 2024_WO_2019081054_A1_H.pdf (Year: 2024).*
(Continued)

*Primary Examiner* — Christopher M Koehler
*Assistant Examiner* — Ahmed F Seck (57) ABSTRACT

The present disclosure relates to a rotor of a motor, a method for maintaining the rotor of the motor, the motor and a wind-power electric generator set. The rotor of the motor includes a magnetic yoke, in which the magnetic yoke is in a cylindrical-like shape, and the magnetic yoke is configured to fix a magnet on its circumference surface; and a rotor support, including a shaft connection unit and a supporting ring, in which the shaft connection unit is coaxially connectable to a rotation shaft of a motor, the supporting ring is arranged on an outer periphery of the shaft connection unit, and the magnetic yoke is connected to the supporting ring; herein, at least one of the magnetic yoke and the supporting
(Continued)

ring of the rotor support has a structure divided into a plurality of segments in a circumference direction of itself.

15 Claims, 6 Drawing Sheets

(58) Field of Classification Search
CPC .... H02K 1/2746; H02K 1/2753; H02K 1/276; H02K 1/278; H02K 1/2786; H02K 1/2787; H02K 1/2788; H02K 1/2789; H02K 1/279; H02K 1/2791; H02K 1/2795; H02K 15/02; H02K 15/03; H02K 23/04; H02K 2201/15
See application file for complete search history.

(56) References Cited

U.S. PATENT DOCUMENTS

| | | | | |
|---|---|---|---|---|
| 5,345,669 | A * | 9/1994 | Zigler | H01F 41/0253 |
| | | | | 310/156.28 |
| 5,459,363 | A * | 10/1995 | Miyakawa | H02K 3/02 |
| | | | | 310/261.1 |
| 2007/0236100 | A1* | 10/2007 | Parsania | H02K 1/32 |
| | | | | 310/61 |
| 2013/0181571 | A1 | 7/2013 | Chang | |
| 2014/0028138 | A1* | 1/2014 | Feher | H02K 1/06 |
| | | | | 310/156.08 |
| 2016/0069352 | A1* | 3/2016 | Kreidler | F04D 25/0653 |
| 2016/0380516 | A1* | 12/2016 | Tomsic | H02K 3/02 |
| | | | | 505/163 |
| 2018/0138767 | A1* | 5/2018 | Moore | B64D 27/18 |
| 2018/0278107 | A1 | 9/2018 | Yabuuchi et al. | |
| 2020/0136492 | A1* | 4/2020 | Shlakhetski | H02K 49/106 |

FOREIGN PATENT DOCUMENTS

| | | | | |
|---|---|---|---|---|
| CN | 102695875 | A | | 9/2012 |
| CN | 104054238 | A | | 9/2014 |
| CN | 102257270 | B | | 1/2015 |
| CN | 106374653 | A * | 2/2017 | ............... H02K 1/27 |
| CN | 107979225 | A * | 5/2018 | ............... H02K 1/18 |
| CN | 109950994 | A | | 6/2019 |
| CN | 209709790 | U | | 11/2019 |
| EP | 3940924 | A1 | | 1/2022 |
| GB | 17268 | A | | 3/1914 |
| GB | 303906 | A | | 6/1930 |
| GB | 2505475 | A | | 3/2014 |
| JP | 85671455 | A | | 6/1981 |
| JP | 6498315 | B2 | | 4/2019 |
| WO | 2011/002763 | A1 | | 1/2011 |
| WO | WO-2019081054 | A1 * | 5/2019 | ............... H02K 1/20 |

OTHER PUBLICATIONS

CN106374653A—Translation.pdf (Year: 2024).*
CN107979225A—Translation (Year: 2024).*
First Indian Office Action dated Mar. 15, 2022; Appln. No. 202117046961.
The Extended European Search Report dated Apr. 13, 2022; Appln. No. 20787468.6.
Australia Exam Report No. 1; Appln. No. 2020256485; dated Aug. 9, 2022.
A Communication from the EPOA dated Jun. 9, 2023; Appln. No. 20 787 468.6.
The First Chinese Office Action dated Apr. 3, 2020; Appln. No. 201910293934.1 Concise Explanation of Relevance in English.
The International Search Report mailed Apr. 13, 2020; PCT/CN2020/074542.

* cited by examiner

ROTOR OF MOTOR, METHOD FOR MAINTAINING ROTOR OF MOTOR, MOTOR AND WIND-POWER ELECTRIC GENERATOR SET

CROSS REFERENCE TO RELATED APPLICATION

This application is a National Stage of International Application No. PCT/CN2020/074542, filed on Feb. 7, 2020, which claims priority to Chinese Patent Application No. 201910293934.1, filed on Apr. 12, 2019, both of which are hereby incorporated by reference in their entireties.

TECHNICAL FIELD

The present disclosure relates to a technical filed of motors, and particularly relates to a rotor of a motor, a method for maintaining the rotor of the motor, the motor and a wind-power electric generator set.

BACKGROUND

A direct-driven permanent-magnet wind-power electric generator is a motor that is directly connected to an impeller to drive. Since there is no gearbox, compared with a double-feed wind power electric generator, the direct-driven permanent-magnet wind-power electric generator has many advantages, such as a high power generation efficiency, a low noise, a high reliability and a low operation and maintenance cost etc.

A speed of the direct-driven permanent-magnet wind-power electric generator is typically very low, in order to increase a power generation efficiency, it has to increase a volume of the motor. Therefore, in the case that a level of a power of the wind-power electric generator is very high, a diameter of the direct-driven permanent-magnet wind-power electric generator has to be increased, result in increasing the difficulty and the cost of transportation of the motor.

SUMMARY

A rotor of a motor, a method for maintaining the rotor of the motor, the motor and a wind-power electric generator set are provided by the present disclosure to improve a transportation convenience of the rotor of the motor.

In a first aspect, the rotor of the motor is provided by the present disclosure, including a magnetic yoke, in which the magnetic yoke is in a cylindrical-like shape, and the magnetic yoke is configured to fix a magnet on its circumference surface; and a rotor support, including a shaft connection unit and a supporting ring, in which the shaft connection unit is coaxially connectable to a rotation shaft of the motor, the supporting ring is arranged on an outer periphery of the shaft connection unit, and the magnetic yoke is arranged to be coaxially connected to the supporting ring; herein, at least one of the magnetic yoke and the supporting ring of the rotor support has a structure divided into a plurality of segments in a circumference direction of itself.

According to any of the embodiments of the present disclosure, the supporting ring has the structure divided into the plurality of segments in the circumference direction of itself, the supporting ring includes a plurality of supporting plates, the plurality of the supporting plates are successively spliced into an annular sheet-like body in the circumference direction, each supporting plate is provided with a first connection portion, the shaft connection unit is provided at its outer periphery with a second connection portion, and the plurality of supporting plates are connected to the second connection portion of the shaft connection unit through the first connection portions.

According to any of the embodiments of the present disclosure, the supporting plate extends in an arc-like direction, and has two opposite ends in the extending arc-like direction, the first connection portion is located between the two ends of the supporting plate; one of the first connection portion and the second connection portion is a convex connection portion, and the other is a concave connection portion matched with the convex connection portion in shape.

According to any of the embodiments of the present disclosure, the supporting plate extends in an arc-like direction, and has two opposite ends in the extending arc-like direction, the first connection portions are arranged at two ends of each the supporting plate; herein two first connection portions of two adjacent supporting plates at a same splicing position are correspondingly connected to one second connection portion of the shaft connection unit.

According to any of the embodiments of the present disclosure, each first connection portion is the convex connection portion, each second connection portion is the concave connection portion, and the concave connection portion simultaneously matches with the two first connection portions at the same splicing position in shape; or each first connection portion is a concave connection portion, each second connection portion is a convex connection portion, and the convex connection portion simultaneously matches with the two first connection portions at the same splicing position in shape.

According to any of the embodiments of the present disclosure, at least one slot is formed on a surface of one of the first connection portion and the second connection portion facing to the other of the first connection portion and the second connection portion, a pair of wedges opposite to each other are inserted and arranged in each slot.

According to any of the embodiments of the present disclosure, the rotor of the motor further includes an end plate, herein the end plate is in a ring-like shape and arranged coaxially with and spaced apart from the supporting ring, the supporting ring and the end plate are respectively arranged at two ends of the magnetic yoke in an axial direction.

According to any of the embodiments of the present disclosure, the supporting ring has the structure divided into the plurality of segments in the circumference direction of itself, the supporting ring includes a plurality of supporting plates, the plurality of the supporting plates are successively spliced into an annular sheet-like body in the circumference direction, the adjacent supporting plates are connected by a connection assembly; and/or the magnetic yoke has the structure divided into the plurality of segments in the circumference direction of itself, the magnetic yoke includes a plurality of magnetic yoke segments, the plurality of magnetic yoke segments are successively spliced into a cylindrical-like body in the circumference direction, the adjacent magnetic yoke segments are connected by a connection assembly; and/or the end plate has the structure divided into the plurality of segments in the circumference direction of itself, the end plate includes a plurality of end plate segments, the plurality of end plate segments are successively spliced into a annular sheet-like body in the circumference direction, the adjacent end plate segments are connected by a connection assembly; and/or the shaft connection unit and the supporting ring are connected by a connection assembly.

According to any of the embodiments of the present disclosure, the adjacent supporting plates, or the adjacent magnetic yoke segments, or the adjacent end plate segments, or the shaft connection unit and the supporting ring form a first pin hole at a splicing position; the connection assembly includes: a connection base plate, connected to the adjacent supporting plates, or connecting with the adjacent magnetic yoke segments, or connecting with the adjacent end plate segments, or connecting the shaft connection unit with the supporting ring, the connection base plate is provided with a second pin hole corresponding to a position of the first pin hole; and a pin block, connecting the second pin hole with the first pin hole, and being fixed to the connection base plate.

According to any of the embodiments of the present disclosure, at each splicing position between the adjacent supporting plates, or between the adjacent magnetic yoke segments, or between the adjacent end plate segments, or between the shaft connection unit and the supporting ring, there is a first connection hole; the connection base plate is provided with a second connection hole corresponding to a position of the first connection hole; the second connection hole of the connection base plate is connected and fixed to the corresponding first connection hole by a first screw bolt penetrating through a first gasket.

According to any of the embodiments of the present disclosure, the connection base plate is provided with a third connection hole around a periphery of the second pin hole; the pin block is in a stepped cylindrical-like shape and is provided with a fourth connection hole corresponding to a position of the third connection hole; the third connection hole of the pin block is connected and fixed to the fourth connection hole of the connection base plate by a second screw bolt penetrating through a second gasket.

According to any of the embodiments of the present disclosure, the supporting ring has the structure divided into plurality of segments in the circumference direction of itself, and includes a plurality of supporting plates, the plurality of supporting plates are successively spliced into an annular sheet-like body in the circumference direction, a first splicing surface is formed between the adjacent supporting plates; the magnetic yoke has the structure divided into the plurality of segments in the circumference direction of itself, the magnetic yoke includes a plurality of magnetic yoke segments, the plurality of magnetic yoke segments are successively spliced into a cylindrical-like body in the circumference direction, a second splicing surface is formed between the adjacent magnetic yoke segments; the end plate has the structure divided into the plurality of segments in the circumference direction of itself, the end plate includes a plurality of end plate segments, the plurality of end plate segments are successively spliced into a annular sheet-like body in the circumference direction, a third splicing surface is formed between the adjacent end plate segments; herein at least two of the first splicing surface, the second splicing surface and the third splicing surface are arranged to be staggered to each other; the rotor of the motor further includes a sealant covering at least one of the first splicing surface, the second splicing surface and the third splicing surface.

According to any of the embodiments of the present disclosure, the supporting ring has the structure divided into plurality of segments in the circumference direction of itself, and includes a plurality of supporting plates, the plurality of supporting plates are successively spliced into an annular sheet-like body in the circumference direction; the magnetic yoke has the structure divided into the plurality of segments in the circumference direction of itself, the magnetic yoke includes a plurality of magnetic yoke segments, the plurality of magnetic yoke segments are successively spliced into a cylindrical-like body in the circumference direction, herein the number of the magnetic yoke segments is any positive integer multiple of the number of the supporting plates.

According to any of the embodiments of the present disclosure, the shaft connection unit includes a central connection portion and a plurality of connection arms radiatively distributed on an outer periphery of the central connection portion; the central connection portion is provided with a through hole matching with the rotation shaft of the motor, and the plurality of the connection arms are connected to the supporting ring; the central connection portion is connected to the rotation shaft of the motor through a connection flange coaxially arranged to the central connection portion.

According to any of the embodiments of the present disclosure, a space between the central connection portion and the supporting ring is divided into a plurality of hollow areas by the plurality of connection arms, the rotor of the motor further includes: a cover plate, the cover plate is arranged to cover the hollow areas.

According to any of the embodiments of the present disclosure, a space between the central connection portion and the supporting ring is divided into a plurality of hollow areas by the plurality of connection arms, the rotor of the motor further includes: a filter unit, the filter unit is arranged in the hollow area.

In a second aspect, a method for maintaining a rotor of a motor is provided by the embodiment of the present disclosure, the rotor of the motor includes a magnetic yoke and a rotor support, at least one of the magnetic yoke and the supporting ring of the rotor support has a structure divided into a plurality of segments in a circumference direction of itself, so that at least one of the magnetic yoke and the supporting ring of the rotor support is configured to be divided into a plurality of segment units, the method for maintaining the rotor of the motor includes: detecting the rotor of the motor and identifying a defective segment unit; separating the defective segment unit from the rotor of the motor so that the rotor of the motor has an area to be filled; and installing a non-defective segment unit having a same function as the defective segment unit into the area to be filled of the rotor of the motor to obtain the repaired rotor of the motor.

According to any of the embodiments in the second aspect of the present disclosure, the rotor of the motor further includes an end plate, at least one of the magnetic yoke, the supporting ring and the end plate has the structure divided into the plurality of segments in the circumference direction of itself, so that at least one of the magnetic yoke, the supporting ring and the end plate is configured to be divided into the plurality of segment units.

In a third aspect, a motor is provided by the embodiment of the present disclosure, including: a fixed shaft; a rotation shaft, coaxially connected to the fixed shaft through a bearing, and the rotation shaft is adapted to rotate; a stator, coaxially fixed to the fixed shaft; and a rotor assembly, coaxially connected to the rotation shaft; the rotor assembly includes the rotor of the motor as described above, and the rotor support of the rotor of the motor is connected to the rotation shaft and is adapted to rotate with the rotation shaft relative to the stator, the circumference surface of the magnetic yoke of the rotor of the motor is provided with a magnet.

In a fourth aspect, a wind-power electric generator set is provided by the embodiment of the present disclosure, including: an impeller, and the motor according to any embodiments as described above, the rotation shaft of the motor is coaxially connected with the impeller.

According to the rotor of the motor provided by the embodiments of the present disclosure, the rotor of the motor includes the rotor support and the magnetic yoke; herein the rotor support can be coaxially connected with the rotation shaft of the motor through the shaft connection unit, and the magnetic yoke is driven to rotate through the supporting ring; the magnet can be arranged on an inner circumference surface or an outer circumference surface of the magnetic yoke, so that the magnet can rotate with the rotation shaft of the motor. Herein, at least one of the magnetic yoke and the supporting ring of the rotor support has the structure divided into the plurality of segments in the circumference direction of itself, so that the magnetic yoke and/or supporting ring can be split into a plurality of segment units; when needed, the plurality of segment units can be spliced to each other to obtain the complete rotor. Since the magnetic yoke and/or the supporting ring can be disassembled, the transportation and storage of the rotor are facilitated, and it is especially suitable for the transportation of rotor of the motors with a larger diameter. In a later maintenance process, the rotor of the motor can be repaired by replacing the segment unit of a faulty part, thereby saving a maintenance cost of the rotor of the motor.

BRIEF DESCRIPTION OF THE DRAWINGS

In order to more clearly illustrate the technical solutions of the embodiments of the present disclosure or the technical solutions in the prior art, the drawings to be used in the description of the embodiments of the present disclosure will be described briefly below. Obviously, the drawings in the following description are merely some embodiments of the present disclosure. For those skilled in the art, other drawings can also be obtained according to these drawings without the inventive labor.

In the drawings:
100—magnetic yoke;
110—magnetic yoke segment;
200—rotor support;
210—shaft connection unit; 211—central connection portion; 212—connection arm;
220—supporting ring; 221—supporting plate;
300—end plate;
310—end plate segment;
400—connection assembly;
410—connection base plate; 420—pin block;
C1—first connection portion; C2—second connection portion;
S1—slot;
W1—wedge;
F1—first splicing surface; F2—second splicing surface; F3—third splicing surface;
H1—first pin hole; H2—second pin hole; H3—first connection hole; H4—second connection hole; H5—third connection hole; H6—fourth connection; H9—through hole;
B1—first screw bolt; B2—second screw bolt;
G1—first gasket; G2—second gasket;
CA—hollow area.

DETAILED DESCRIPTION

To make the objects, technical solutions and advantages of the present disclosure to be more apparent, the present disclosure will be further described in detail below with reference to the accompanying drawings and specific embodiments. It shall be understood that the specific embodiments described herein are only to be construed as illustrative and not limiting. To the person skilled in the art, the present disclosure may be implemented without some of the specific details.

It shall be noted that, in this context, relational terms such as first and second are merely used to distinguish one entity or operation from another entity or operation, and do not necessarily require or imply any such actual relationship or order between the entities or operations. Further, the term "comprise", "include" or any other variations thereof is intended to encompass a non-exclusive inclusion, such that a process, method, article, or device including a plurality of elements includes not only these elements but also other elements not listed, or elements that are inherent to such process, method, article or device. Without more limitations, an element that is defined by an expression "comprises . . . ", does not exclude other identical elements in the process, method, article, or device comprising this element.

The embodiments of the present disclosure provides a rotor of a motor, which can be applied to the motor to rotate relative to a stator of the motor to generate electricity or perform work.

Figure 1:
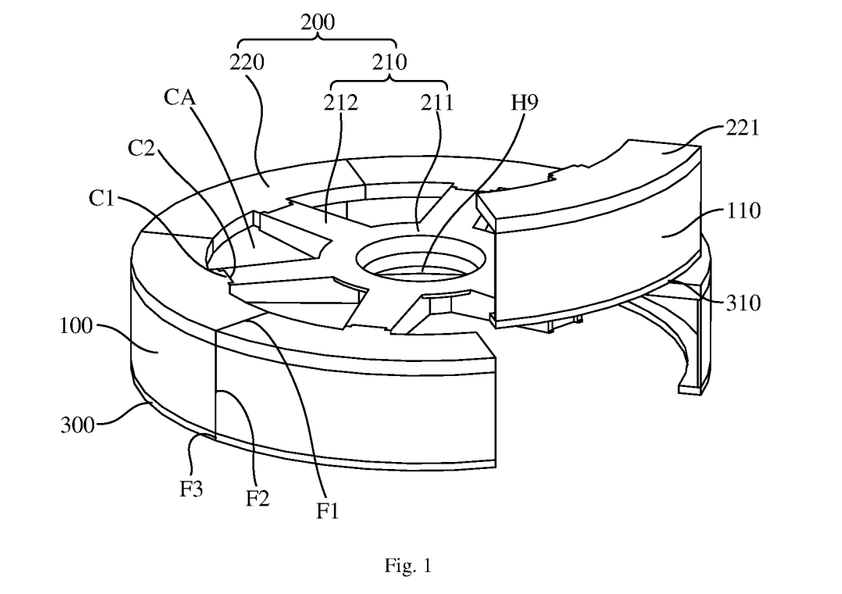
FIG. 1 shows a perspective view of a rotor of a motor according to a first embodiment of the present disclosure.

FIG. 1 shows a perspective view of the rotor of the motor according to a first embodiment of the present disclosure; the rotor of the motor of the embodiment includes a magnetic yoke 100 and a rotor support 200. Herein, the magnetic yoke 100 is in a cylindrical-like shape, and a magnet can be fixed on a circumference surface of the magnetic yoke 100. It should be understood that the magnetic yoke 100 has an inner circumference surface and an outer circumference surface; in some embodiments, the magnet may be fixed to the outer circumference surface of the magnetic yoke 100, thereby forming the rotor of the motor of an inner-rotor-type motor. In this embodiment, the magnet may be fixed on the inner circumference surface of the magnetic yoke 100 to form the rotor of the motor of an outer-rotor-type motor.

The rotor support 200 includes a shaft connection unit 210 and a supporting ring 220; herein the shaft connection unit 210 can be coaxially connected to a rotation shaft of the motor, the supporting ring 220 is arranged on an outer periphery of the shaft connection unit 210, and the magnetic yoke 100 is arranged to be coaxially connected to the supporting ring 220. When the rotation shaft of the motor rotates, the shaft connection unit 210 rotates accordingly, and drives the supporting ring 220 and the magnetic yoke 100 connected to the supporting ring 220 to rotate, so that the magnetic yoke 100 rotates coaxially with the rotation shaft of the motor.

In this embodiment, at least one of the magnetic yoke 100 and the supporting ring 220 of the rotor support 200 has a structure divided into a plurality of segments in a circumference direction of itself, so that the magnetic yoke 100 and/or supporting ring 220 can be split into a plurality of segment units; when needed, the plurality of segment units can be spliced to each other to obtain the complete rotor support 200 and the complete magnetic yoke 100, further to obtain a complete rotor structure.

In this text, "a structure divided into a plurality of segments in a circumference direction of itself refers to the structure that is divided into the plurality of segment units in the circumference direction of itself and formed by the plurality of segment units successively spliced in the circumference direction.

Since the magnetic yoke 100 and/or the supporting ring 220 can be disassembled, a volume of the plurality of segment units can be significantly smaller than a volume of the overall rotor, which is convenient for the transportation and store of the rotor while ensuring that the complete rotor can meet the power requirement. Especially for the rotors of large-volume motors such as a high-power direct-driven permanent-magnet wind-power electric generator etc., the transportation cost can be reduced.

During a later stage of a maintenance process of the rotor of the motor, the repair can be achieved by replacing the segmented unit of the faulty part; for example, when the magnetic yoke 100 has the structure divided into the plurality of segments in the circumference direction of itself, it may include a plurality of magnetic yoke segments 110 spliced with each other; if one of the magnetic yoke segments 110 fails, only the new magnetic yoke segment 110 needs to be used to replace the faulty magnetic yoke segment 110 to continue the stable operation of the rotor of the motor, thereby saving the maintenance cost of the rotor of the motor.

As shown in FIG. 1, in this embodiment, the shaft connection unit 210 includes a central connection portion 211 and a plurality of connection arms 212 radiatively distributed on an outer periphery of the central connection portion 211. The central connection portion 211 may be in a circular ring-like shape, and a through hole H9 matching with a rotation shaft of the motor is arranged inside the central connection portion 211, and the central connection portion 211 may be coaxially connected to the rotation shaft of the motor through the through hole H9. In some embodiments, the central connection portion is connected to the rotation shaft of the motor through a connection flange coaxially arranged to the central connection portion. The plurality of connection arms 212 are connected to the supporting ring 220, so that the rotational movement of the central connection portion 211 can be transmitted to the supporting ring 220. A space between the central connection portion 211 and the supporting ring 220 is divided into a plurality of hollow areas CA by the plurality of connection arms 212, that is, the plurality of connection arms 212 and the central connection portion 211 together form a spoke-type structure. Since the spoke-type structure includes the plurality of hollow areas CA, the weight of the rotor support 200 can be reduced and the material cost can be saved.

According to different designs of the motor or the rotor of the motor, the rotor of the motor may also include other components that cover or fill the above-mentioned hollow areas CA. For example, the rotor of the motor further includes a cover plate, the cover plate is arranged to cover the hollow areas CA. The cover plate may be a ring-like single structure and cover the plurality of hollow areas CA at the same time; there may also be a plurality of cover plates, for example, the number of the cover plates corresponds to the number of hollow areas CA, and the cover plates are arranged to cover the hollow areas CA in one-to-one correspondence. By arranging the cover plate, the protective effect of the magnet and other components in the rotor of the motor can be improved. Further for example, the rotor of the motor further includes a filter unit, which is, for example, a filter box, which can filter gas passing through the filter unit. The filter unit is arranged in the hollow areas CA, the filter unit can be connected to at least one of the supporting ring 220, the connection arm 212 and the central connection portion 211. There may be a plurality of filter units, for example, they are arranged in one-to-one correspondence with the hollow areas CA. By arranging the filter unit, an inside of the rotor of the motor can be ventilated with an outside, and at the same time, the air flowing from the outside to the inside of the rotor of the motor can be filtered, which can improve the protection effect of the magnet and other components in the rotor of the motor.

In this embodiment, the rotor of the motor further includes an end plate 300, the end plate 300 is in a ring-like shape and arranged coaxially with and spaced apart from the supporting ring 220 of the rotor support 200, and the supporting ring 220 and the end plate 300 are respectively arranged at two ends of the magnetic yoke 100 in an axial direction.

When the rotor of the motor is applied to the motor, it can rotate relative to the stator of the motor to generate electricity or perform work. The stator may include a sealing ring matched with the end plate 300 of the rotor of the motor; herein, an orthographic projection of the sealing ring on a plane perpendicular to an axial direction of the rotor of the motor overlaps with an orthographic projection of the end plate 300 on a plane perpendicular to the axial direction of the rotor of the motor; a structure such as a sealing rubber strip may be provided between the sealing ring and the end plate 300, so that a dynamic seal is formed between the end plate 300 and the sealing ring of the stator.

At least one of the magnetic yoke 100, the supporting ring 220 and the end plate 300 may be the structure divided into the plurality of segments in the circumference direction of itself, in the first embodiment of the present disclosure, taking that each of the magnetic yoke 100, the supporting ring 220 and the end plate 300 has the structure divided into the plurality of segments in the circumference direction of itself as an example for illustration. It should be understood that in the rotor of the motor of some other embodiments, one of the magnetic yoke 100, the supporting ring 220 and the end plate 300 may be the structure divided into the plurality of segments in the circumference direction of itself, or any two of the magnetic yoke 100, the supporting ring 220 and the end plate 300 may be the structures divided into the plurality of segments in the circumference direction of itself.

Figure 2:
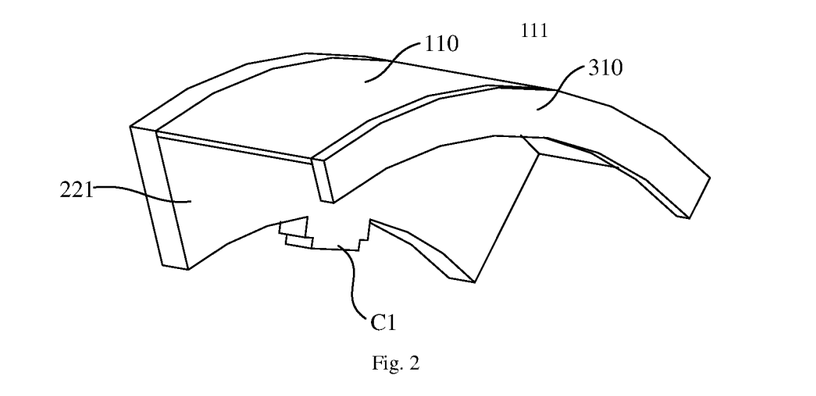
FIG. 2 shows a perspective view of a part of a segment unit of a rotor of a motor according to the first embodiment of the present disclosure.

As shown in FIG. 1, a part of the segment unit of the rotor of the motor is exploded and shown. FIG. 2 shows a perspective view of the part of the segment unit of the rotor of the motor according to the first embodiment of the present disclosure. In this embodiment, the magnetic yoke 100 has the structure divided into the plurality of segments in the circumference direction of itself, the magnetic yoke 100 includes the plurality of magnetic yoke segments 110, the plurality of magnetic yoke segments 110 are successively spliced into a cylindrical-like body in the circumference direction. The supporting ring 220 has the structure divided into the plurality of segments in the circumference direction of itself, the supporting ring 220 includes a plurality of supporting plates 221, the plurality of the supporting plates 221 are successively spliced into an annular sheet-like body in the circumference direction. The end plate 300 has the structure divided into the plurality of segments in the circumference direction of itself, the end plate 300 includes a plurality of end plate segments 310, the plurality of end plate segments 310 are successively spliced into an annular sheet-like body in the circumference direction.

Herein, the magnetic yoke segment 110 and the supporting plate 221, and the magnetic yoke segment 110 and the end plate segment 310 may be connected by bolting, welding, or the like.

As shown in FIG. 1 and FIG. 2, in this embodiment, each supporting plate 221 is provided with a first connection portion C1, and the outer periphery of the shaft connection unit 210 is provided with a second connection portion C2, so that the plurality of supporting plates 221 can pass through the first connection portion C1 and connect to the second connection portion C2 of the shaft connection unit 210.

Specifically, each supporting plate 221 extends in an arc-like direction, and has two opposite ends in the extending arc-like direction; in this embodiment, the first connection portion C1 is located between the two ends of the supporting plate 221. In this embodiment, the shaft connection unit 210 includes the plurality of connection arms 212, the second connection portion C2 is arranged at an end of each connection arm 212 away from the central connection portion 211; the number of the connection arms 212 may be the same as the number of the supporting plates 221, and the plurality of connection arms 212 are connected to the plurality of supporting plates 221 in one-to-one correspondence.

In this embodiment, the first connection portion C1 is a convex connection portion, and the second connection portion C2 is a concave connection portion, the concave connection portion is matched with the convex connection portion in shape. In some other embodiments, the second connection portion C2 may also be the convex connection portion, and the first connection portion C1 may be the concave connection portion that matches with the convex connection portion in shape. The convex connection portion and the concave connection portion are matched and connected with each other, which can transmit a tangential load in a structure of the rotor of the motor, so that the shaft connection unit 210 can drive the supporting ring 220 spliced completely to rotate, thereby driving the magnetic yoke 100 to rotate.

In some embodiments, the number of the magnetic yoke segments 110 included in the rotor of the motor, the number of supporting plates 221, and the number of end plate segments 310 are the same. In some other embodiments, the number of magnetic yoke segments 110 can also be greater than the number of supporting plates 221; the number of magnetic yoke segments 110 can also be greater than the number of end plate segments 310. In some embodiments, the number of magnetic yoke segments 110 may be any positive integer multiple of the number of supporting plates 221.

As shown in FIG. 1, as described above, the plurality of supporting plates 221 are successively spliced into the annular sheet-like body in the circumference direction, the plurality of magnetic yoke segments 110 are successively spliced into the cylindrical body in the circumference direction, and the plurality of end plate segments 310 are successively spliced into the annular sheet-like bodies in the circumference direction. Herein, a first splicing surface F1 is formed between the adjacent supporting plates 221, a second splicing surface F2 is formed between adjacent magnetic yoke segments 110, and a third splicing surface F3 is formed between adjacent end plate segments 310.

In this embodiment, the first splicing surface F1, the second splicing surface F2 and the third splicing surface F3 are aligned with each other; when the rotor of the motor is in a disassembled state, the supporting plate 221, the magnetic yoke segment 110 and the end plate segment 310 can be connected to each other to obtain a prefabricated segment; a size of each prefabricated segment is smaller than that of the complete rotor, which is convenient for transportation. In a process of assembling and obtaining the complete rotor of the motor, a plurality of prefabricated segments are spliced and connected to each other, which can further save the time cost of assembling and splicing the rotor of the motor and reduce the installation complexity. In some other embodiments, at least two of the above-mentioned first splicing surface F1, second splicing surface F2 and third splicing surface F3 may be arranged to be staggered with each other.

Figure 3:
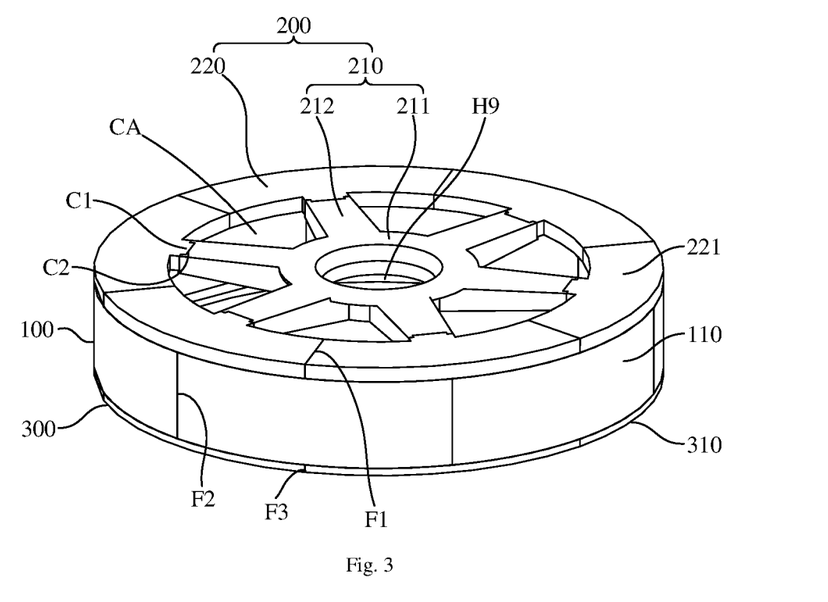
FIG. 3 shows a perspective view of a rotor of a motor according to a second embodiment of the present disclosure.

FIG. 3 shows a perspective view of the rotor of the motor according to a second embodiment of the present disclosure. The rotor of the motor includes the magnetic yoke 100, the rotor support 200 and the end plate 300; the specific structures and connection relationships of the magnetic yoke 100, the rotor support 200 and the end plate 300 in the second embodiment are substantially the same as the corresponding structures and connection relationships in the first embodiment. The difference from the first embodiment is that, in the second embodiment, the first splicing surface F1 and the second splicing surface F2 described above are arranged to be staggered with each other, and the second splicing surface F2 and the third splicing surface F3 are also arranged to be staggered with each other. The first splicing surface F1, the second splicing surface F2 and the third splicing surface F3 are arranged to be regularly staggered with each other, which can share a force, increase a force area, and increase a friction among splicing parts, so that the rotor of the motor can be made stronger and more stable, and the integrity of the rotor of the motor can be improved.

In some embodiments, the rotor of the motor further includes a sealant covering at least one of the first splicing surface F1, the second splicing surface F2 and the third splicing surface F3, thereby improving the sealing performance of at least one of the rotor support 200, the magnetic yoke 100 and the end plate 300. For example, the second splicing surface F2 between each adjacent magnetic yoke segments 110 is covered with the sealant, so as to prevent multi-phase flow impurities from entering the rotor of the motor from the second splicing surface F2, and improve the sealing performance of the magnetic yoke 100. The sealant can be a moisture-curing sealant, for example, Terostat-MS 930 sealant can be used.

Figure 4:
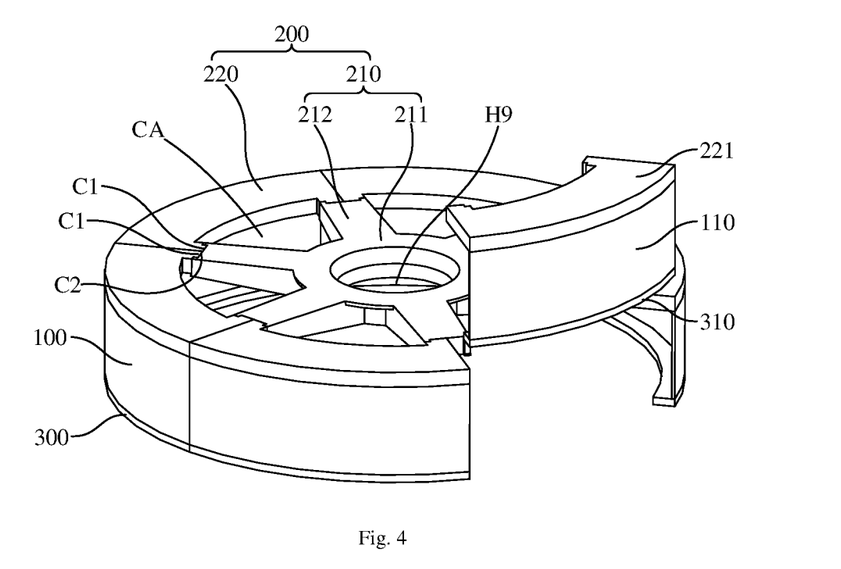
FIG. 4 shows a perspective view of a rotor of a motor according to a third embodiment of the present disclosure.

FIG. 4 shows a perspective view of the rotor of the motor according to a third embodiment of the present disclosure; the rotor of the motor in this embodiment includes the magnetic yoke 100, the rotor support 200 and the end plate 300.

The rotor support 200 includes the shaft connection unit 210 and the supporting ring 220; the shaft connection unit 210 includes a central connection portion 211 and a plurality of connection arms 212 radiatingly distributed on the outer periphery of the central connection portion 211. The through hole H9 matching with the rotation shaft of the motor is formed inside the central connection portion 211. The plurality of connection arms 212 are connected to the supporting ring 220.

The magnetic yoke 100 is in the cylindrical-like shape, and the end plate 300 is in the ring-like shape; the end plate 300 is arranged coaxially with and spaced apart from the supporting ring 220 of the rotor support 200; the supporting ring 220 and the end plate 300 are respectively arranged at two ends of the magnetic yoke 100 in the axial direction.

Figure 5:
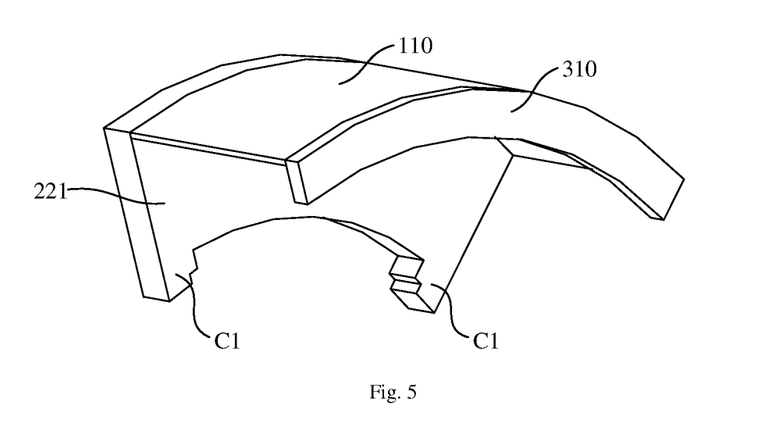
FIG. 5 shows a perspective view of a part of a segment unit of a rotor of a motor according to a third embodiment of the present disclosure.

In this embodiment, each of the magnetic yoke 100, the supporting ring 220, and the end plate 300 has the structure divided into the plurality of segments in the circumference direction of itself. In FIG. 4, the part of the segment unit of the rotor of the motor is exploded and shown. FIG. 5 shows a perspective view of the part of the segment unit of the rotor of the motor according to the third embodiment of the present disclosure.

The magnetic yoke 100 includes the plurality of magnetic yoke segments 110, the plurality of magnetic yoke segments 110 are successively spliced into the cylindrical-like body in the circumference direction. The supporting ring 220 includes the plurality of supporting plates 221, the plurality of the supporting plates 221 are successively spliced into the annular sheet-like body in the circumference direction. The end plate 300 includes the plurality of end plate segments 310, the plurality of end plate segments 310 are successively spliced into the annular sheet-like body in the circumference direction. The magnetic yoke segment 110 and the supporting plate 221, and the magnetic yoke segment 110 and the end plate segment 310 may be connected by bolting, welding, or the like.

As shown in FIG. 4 and FIG. 5, in this embodiment, each supporting plate 221 is provided with the first connection portion C1, and the outer periphery of the shaft connection unit 210 is provided with the second connection portion C2, so that the plurality of supporting plates 221 can pass through the first connection portion C1 and connect to the second connection portion C2 of the shaft connection unit 210.

The difference from the first embodiment is that, each supporting plate 221 extends in the arc-like direction and has two opposite ends in the extending arc-like direction, and the first connection portions C1 are arranged at two ends of each supporting plate 221. Herein, two first connection portions C1 of two adjacent supporting plates 221 at the same splicing position are correspondingly connected to the second connection portion C2 of the shaft connection unit 210.

In this embodiment, the shaft connection unit 210 includes the plurality of connection arms 212, the second connection portion C2 is arranged at the end of each connection arm 212 away from the central connection portion 211; in this embodiment, the number of connection arms 212 is the same as the number of supporting plates 221, the number of first connection portions C1 is twice of the number of second connection portions C2; each second connection portion C2 is connected to the two first connection portions C1, one of the two first connection portions C1 is located on the supporting plate 221, and the other first connection portions C1 is located on the other adjacent supporting plate 221, so that every two adjacent supporting plates 221 are connected to the same connection arm 212.

In this embodiment, each first connection portion C1 is the convex connection portion, and each second connection portion C2 is the concave connection portion, and the concave connection portion is matched with the two first connection portions C1 in shape at the same splicing position at the same time. That is, the adjacent supporting plates 221 are spliced with each other, and the two first connection portions C1 at the splicing position are also spliced to form a combined shape of the two first connection portions C1, and the combined shape matches with the shape of the second connection portion C2.

In some other embodiments, each first connection portion C1 may also be configured as the concave connection portion; each second connection portion C2 may be configured as the convex connection portion, and the convex connection portion can match with the two first connection portions C1 in shape at the same splicing position at the same time.

Figure 6:
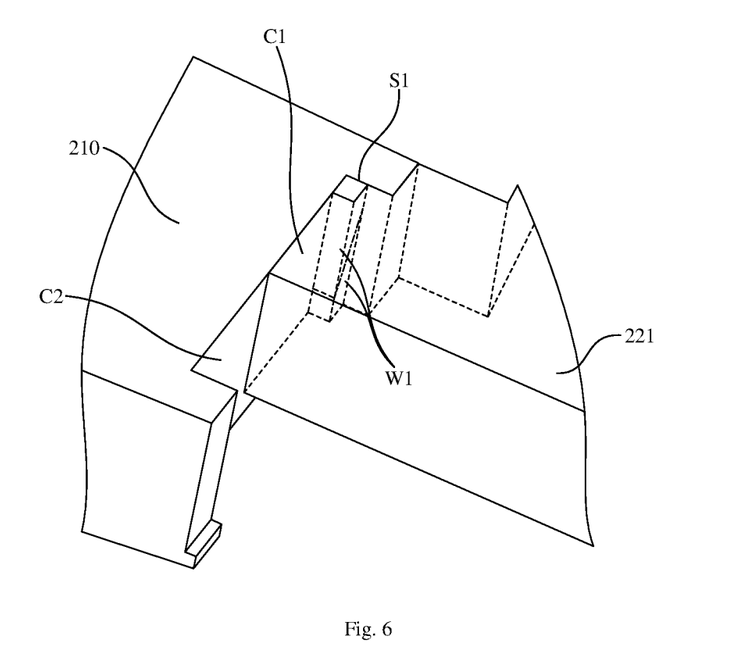
FIG. 6 shows a perspective view of a connection part between a supporting plate of a rotor of a motor and a shaft connection unit according to a third embodiment of the present disclosure.
Figure 7:
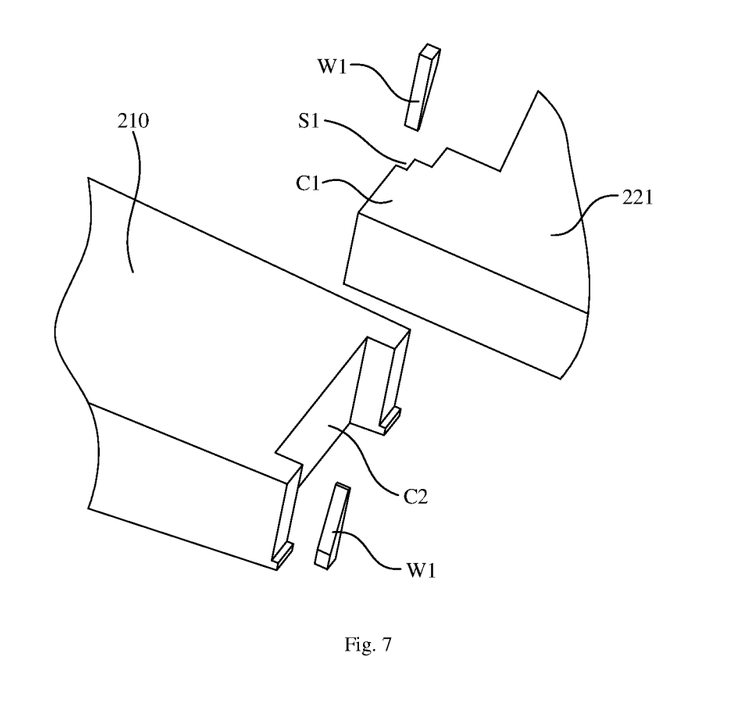
FIG. 7 shows a perspective exploded view of a connection part between a supporting plate of a rotor of a motor and a shaft connection unit according to a third embodiment of the present disclosure.

FIG. 6 and FIG. 7 respectively show a perspective view and a perspective exploded view of a connection part between the supporting plate of the rotor of the motor and the shaft connection unit according to the third embodiment of the present disclosure. Further, at least one slot S1 is formed on a surface of one of the first connection portion C1 and the second connection portion C2 facing to the other of the first connection portion (C1) and the second connection portion (C2), and a pair of wedges W1 opposite to each other are inserted and arranged in each slot S1.

In this embodiment, the first connection portion C1 is a rectangular parallelepiped block-like convex connection portion, and has two corners at an end thereof facing to the second connection portion C2. For the convenience of description, the two corners of the first connection portion C1 are denoted as a first corner and a second corner. The second connection portion C2 is a rectangular parallelepiped concave connection portion; the concave connection portion penetrates two opposite surfaces of the shaft connection unit 210 in an axial direction, thereby having a first wall surface facing to the supporting plate 221 and a second wall surface and a third wall surface connected to the first wall surface; herein, the second wall surface and the third wall surface are arranged opposite to each other. When the supporting plate 221 is connected to the shaft connection unit 210, in each first connection portion C1, the above-mentioned first corner is in contact with the above-mentioned first wall surface and the above-mentioned second wall surface; the above-mentioned second corner is in contact with the above-mentioned first wall surface and the first connection portion C1 of the adjacent supporting plate 221. In this embodiment, the slot S1 is arranged at the above-mentioned first corner. The pair of wedges W1 are inserted into the slot S1 in the axial direction opposite to each other, so that connection surfaces at a position where the supporting plate 221 and the shaft connection unit 210 are connected are more closely fitted, which can effectively ensure torque transmission and increase structural stability.

Figure 8:
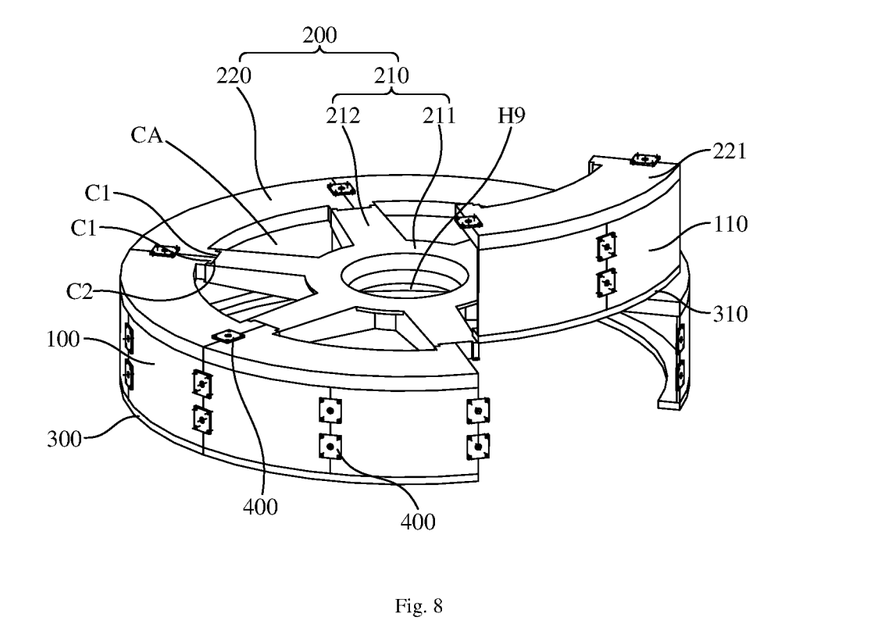
FIG. 8 shows a perspective view of a rotor of a motor according to a fourth embodiment of the present disclosure.

FIG. 8 shows a perspective view of the rotor of the motor according to a fourth embodiment of the present disclosure. The rotor of the motor includes the magnetic yoke 100, the rotor support 200 and the end plate 300; the specific structures and connection relationships of the magnetic yoke 100, the rotor support 200 and the end plate 300 in the fourth embodiment are substantially the same as the corresponding structures and connection relationships in the third embodiment.

The difference from the third embodiment is that the magnetic yoke 100 includes the plurality of magnetic yoke segments 110 which are successively spliced into the cylindrical-like body in the circumference direction. The supporting ring 220 includes the plurality of supporting plates 221, the plurality of the supporting plates 221 are successively spliced into the annular sheet-like body in the circumference direction. The end plate 300 includes the plurality of end plate segments 310, the plurality of end plate segments 310 are successively spliced into the annular sheet-like body in the circumference direction. The number of the magnetic yoke segments 110 is twice of the number of the supporting plates 221; the number of the magnetic yoke segments 110 is also twice of the number of end plate segments 310; the supporting plates 221 are arranged to be spaced apart the end plate segments 310 in one-to-one correspondence; two supporting plates 221 are connected between each pair of supporting plate 221 and the end plate segment 310 which are arranged to be spaced apart. The magnetic yoke segment 110 with a curved structure is divided into more segments, which can further improve the convenience of transportation.

In addition, in some embodiments, the supporting ring 220 has the structure divided into the plurality of segments in the circumference direction of itself, the supporting ring 220 includes the plurality of supporting plates 221, the plurality of the supporting plates 221 are successively spliced into an annular sheet-like body in the circumference direction, and the adjacent supporting plates 221 are connected by a connection assembly 400.

In some embodiments, the magnetic yoke 100 has the structure divided into the plurality of segments in the circumference direction of itself, the magnetic yoke 100 includes the plurality of magnetic yoke segments 110, the plurality of magnetic yoke segments 110 are successively spliced into a cylindrical-like body in the circumference direction, and the adjacent magnetic yoke segments 110 are connected by the connection assembly 400.

In some embodiments, the end plate 300 has the structure divided into the plurality of segments in the circumference direction of itself, the end plate 300 includes a plurality of end plate segments 310, the plurality of end plate segments 310 are successively spliced into an annular sheet-like body in the circumference direction, and the adjacent end plate segments 310 are connected by the connection assembly 400.

In addition, in some embodiments, the shaft connection unit 210 and the supporting ring 220 are connected by the connection assembly 400. Further, in some embodiments, the supporting ring 220 has the structure divided into the plurality of segments in the circumference direction of itself; the supporting ring 220 includes the plurality of supporting plates 221; each supporting plate 221 is provided with the first connection portion C1; the outer periphery of the shaft connection unit 210 is provided with the second connection portion C2, and the first connection portion C1 of each supporting plate (221) is connected to the second connection portion C2 of the shaft connection unit 210 by the connection assembly 400.

For example, in this embodiment, the adjacent supporting plates 221 and the adjacent magnetic yoke segments 110 are connected by the connection assembly 400. Herein, each pair of adjacent supporting plates 221 can be connected by a set of connection assemblies 400; each pair of adjacent magnetic yoke segments 110 can be connected by the set of connection assemblies 400. In some other embodiments, the number of connection assemblies 400 arranged between each pair of the adjacent magnetic yoke segments 110, between each pair of the adjacent supporting plates 221, between each pair of the adjacent end plate segments 310, and between the shaft connection unit 210 and the supporting ring 220 may be adjusted and set as needed.

Figure 9:
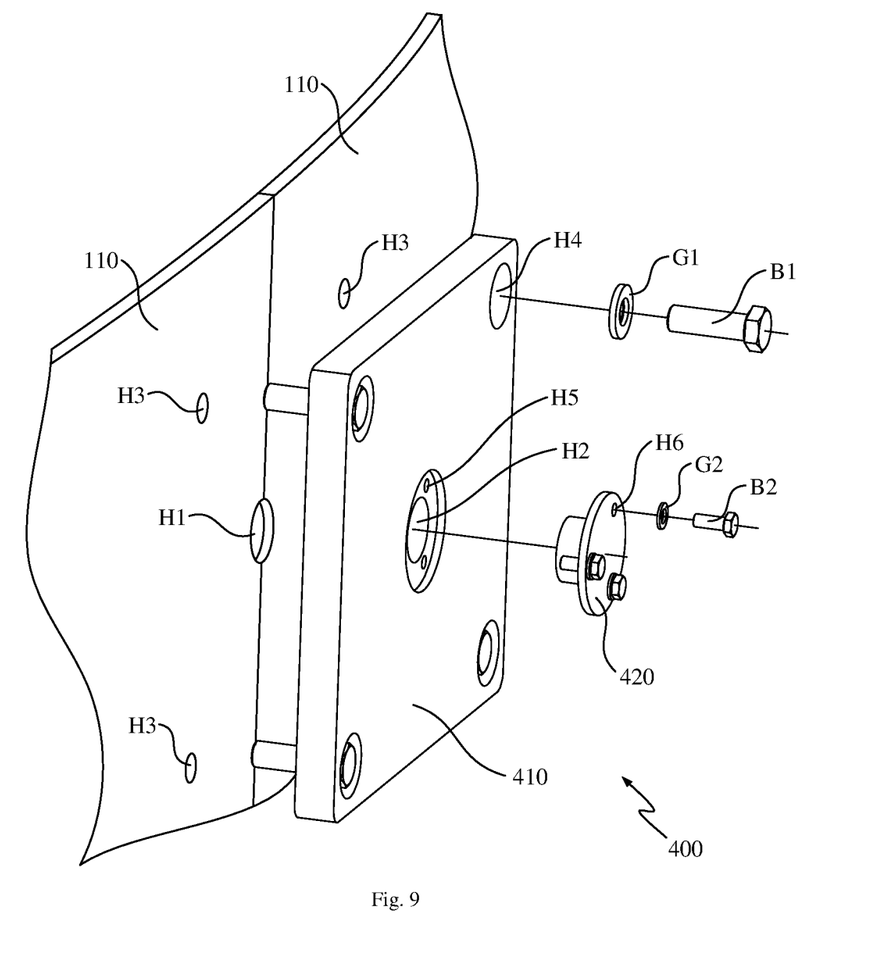
FIG. 9 shows a perspective exploded view of a connection assembly in a rotor of a motor according to a fourth embodiment of the present disclosure.

FIG. 9 shows a perspective exploded view of the connection assembly in the rotor of the motor according to the fourth embodiment of the present disclosure. In FIG. 9, the connection assembly 400 connecting with adjacent magnetic yoke segments 110 is taken as an example for illustration, the connection assembly 400 connecting with the adjacent supporting plates 221, and the connection assembly 400 connecting with the adjacent end plate segments 310 are similar in structure to this connection assembly 400, and will not be described in detail.

The adjacent magnetic yoke segments 110 form a first pin hole H1 at the splicing position. In this embodiment, the first pin hole H1 is simultaneously formed at the splicing position by the adjacent magnetic yoke segments 110; each magnetic yoke segment 110 has a half structure of the first pin hole H1 at the splicing position, so that when the adjacent magnetic yoke segments 110 are spliced, the complete first pin hole H1 can be formed. It should be noted that the first pin hole H1 is not limited to being simultaneously formed by the adjacent magnetic yoke segments 110; in some other embodiments, the first pin holes H1 can also be completely formed on a surface of at least any one of the adjacent magnetic yoke segments 110, and the number and the size of the first pin holes H1 can be adjusted and designed according to the magnitude of the load.

It can be understood that when the connection assembly 400 is connected to the adjacent supporting plate 221, or the adjacent end plate segments 310, or the shaft connection unit 210 and the supporting ring 220, the above-mentioned first pin hole H1 may also be formed at the splicing position of the adjacent supporting plates 221 or the adjacent end plate segments 310 or the shaft connection unit 210 and the supporting ring 220.

The connection assembly 400 of the embodiment in the present disclosure includes a connection base plate 410 and a pin block 420. Herein, the connection base plate 410 is connected to the adjacent magnetic yoke segments 110.

At each splicing position between the adjacent supporting plates 221, or between the adjacent magnetic yoke segments 110, or between the adjacent end plate segments 310, or between the shaft connection unit 210 and the supporting ring 220, there is a first connection hole H3; the connection base plate 410 is provided with a second connection hole H4 corresponding to a position of the first connection hole H3; the second connection hole H4 on the connection base plate 410 is connected and fixed to the corresponding first connection hole H3 by a first screw bolt B1 penetrating through a first gasket G1.

In this embodiment, each magnetic yoke segment 110 has the first connection hole H3; the connection base plate 410 is provided with the second connection hole H4 corresponding to a position of the first connection hole H3 of the adjacent magnetic yoke segment 110; the second connection holes H4 of the connection base plate 410 are respectively connected and fixed to the first connection holes H3 of the adjacent magnetic yoke segments 110 by the first screw bolt B1 penetrating through the first gasket G1, so as to realize the connection of the adjacent magnetic yoke segments 110.

It should be understood that when the connection assembly 400 is connected to the adjacent supporting plates 221, or the adjacent end plate segments 310, or the shaft connection unit 210 and the supporting ring 220, the connection base plate 410 may be connected to the adjacent supporting plates 221, or connecting with the adjacent end plate segments 310, or connecting with the shaft connection unit 210 and the supporting ring 220.

The connection base plate 410 is provided with a second pin hole H2 corresponding to a position of the first pin hole H1; the pin block 420 connects the second pin hole H2 with the first pin hole H1, and the pin block 420 is fixed to the connection base plate 410.

In this embodiment, the connection base plate 410 is provided with a third connection hole H5 around a periphery of the second pin hole H2; the pin block 420 is in a stepped cylindrical-like shape and is provided with a fourth connection hole H6 corresponding to a position of the third connection hole H5; the third connection hole H5 of the pin block 420 is connected and fixed to the fourth connection hole H6 of the connection base plate 410 by a second screw bolt B2 penetrating through a second gasket G2, so as to realize the connection of the pin block 420 and the connection base plate 410. At the same time, the second pin hole H2 and the first pin hole H1 are positioned and connected to each other by the pin block 420.

The specific number of the first screw bolts B1 and the pin blocks 420 in the connection assembly 400 may be determined by actual conditions. The first screw bolt B1 and the pin block 420 are arranged in the connection assembly 400, so that a connection structure formed by the connection assembly 400 and the adjacent magnetic yoke segments 110, or the adjacent supporting plates 221, or the adjacent end plate segments 310 can effectively bear the loads in the axial direction and a tangential direction. At the same time, the connection process of the above structure is simple and convenient to assemble.

In some embodiments, the first pin hole H1 and the first connection hole H3 may be blind holes formed on a surface of the magnetic yoke segment 110 facing to the connection base plate 410, so as to prevent the pin block 420 and the first screw bolt B1 from penetrating the magnetic yoke segment 110. When the magnet is arranged on an inside surface of the magnetic yoke 100, the blind hole design of the first pin hole H1 and the first connection hole H3 can avoid interference caused by the pin block 420 and the first screw bolt B1 when the magnet is installed.

The motor is further provided by the embodiment of the present disclosure, the motor can be applied to the wind-power electric generator set for electric generation; the wind power electric generator is, for example, a direct-drive permanent-magnet wind-power electric generator. The motor includes a fixed shaft, a rotation shaft, the stator and a rotor assembly. The fixed shaft is fixedly arranged in a nacelle of the wind-power electric generator set, the rotation shaft is coaxially connected with the fixed shaft through a bearing, and the rotation shaft can be connected with a hub and blades of the wind-power electric generator set so as to be able to rotate. The stator is coaxially fixed with the fixed shaft, the stator may include a stator iron core and a stator winding set. The rotor assembly is coaxially connected with the rotation shaft, the rotor assembly may include the rotor of the motor of any one of the above embodiments; the rotor support 200 of the rotor of the motor is connected to the rotation shaft and is adapted to rotate with the rotation shaft relative to the stator, the magnet is arranged on the circumference surface of the magnetic yoke 100 of the rotor of the motor. When the motor is the outer-rotor-type motor, the magnet is arranged on the inner circumference surface of the magnetic yoke 100 of the rotor of the motor; when the motor is the inner-rotor-type motor, the magnet is arranged on the outer circumference surface of the magnetic yoke 100 of the rotor of the motor. When the rotor of the motor rotates relative to the stator, the stator winding set included in the stator cuts the magnetic force lines formed by the magnet on the rotor assembly, thereby generating electricity.

According to the rotor of the motor and the motor in the embodiments of the present disclosure, the rotor of the motor includes the rotor support 200 and the magnetic yoke 100; at least one of the magnetic yoke 100 and the supporting ring 220 of the rotor support 200 has the structure divided into the plurality of segments in the circumference direction of itself, so that the magnetic yoke 100 and/or supporting ring 220 can be split into the plurality of segment units; when needed, the plurality of segment units can be spliced to each other to obtain the complete rotor support 200 and the complete magnetic yoke 100, further to obtain the complete rotor structure. Since the magnetic yoke 100 and/or the supporting ring 220 can be disassembled, the volume of the plurality of segment units can be significantly smaller than the volume of the overall rotor, which is convenient for the transportation and store of the rotor while ensuring that the complete rotor can meet the power requirement. Especially for the rotors of large-volume motors such as the high-power direct-driven permanent-magnet wind-power electric generator etc., the transportation cost can be reduced.

During the later stage of the maintenance process of the rotor of the motor, the repair can be achieved by replacing the segmented unit of the faulty part; for example, when the magnetic yoke 100 has the structure divided into the plurality of segments in the circumference direction of itself, it may include the plurality of magnetic yoke segments 110 spliced with each other; if one of the magnetic yoke segments 110 fails, only the new magnetic yoke segment 110 needs to be used to replace the faulty magnetic yoke segment 110 to continue the stable operation of the rotor of the motor, thereby saving the maintenance cost of the rotor of the motor.

In this embodiment, at least one of the magnetic yoke 100 and the supporting ring 220 of the rotor support 200 has the structure divided into the plurality of segments in the circumference direction of itself, so that at least one of the magnetic yoke 100 and the supporting ring 220 of the rotor support 200 can be divided into the plurality of segment units. A process for maintaining the rotor of the motor is, for example: detecting the rotor of the motor, identifying a defective segment unit; then separating the defective segment unit from the rotor of the motor, so that the rotor of the motor has an area to be filled; and then installing a non-defective segment unit having a same function as the defective segment unit into the area to be filled of the rotor of the motor to obtain the repaired rotor of the motor.

In the step of detecting the rotor of the motor, a manual detection can be performed, or a detection can be performed by a matching detection device. When the rotor of the motor is the rotor of the motor of the wind-power electric generator set, the process for maintaining the rotor of the motor can be performed on a top of a tower column of the wind-power electric generator set, without the need to transport the rotor of the motor to the bottom of the tower column (such as the ground or the sea) for maintenance. Specifically, after completing the steps of detecting the rotor of the motor and separating the defective segment unit from the rotor of the motor at the top of the tower column, since a weight of the defective segment unit is much lower than a weight of the entire rotor of the motor, a conventional hoisting equipment in the field of the wind-power electric generator set can be used to transport the rotor of the motor to the ground or the sea. In addition, a weight of the non-defective segment unit is much lower than the weight of the entire rotor of the motor. Therefore, the conventional hoisting equipment in the field of the wind-power electric generator set can be used to transport the rotor of the motor from the ground or sea to the top of the tower column, and then the non-defective segment unit is installed in the area to be filled of the rotor of the motor through the matching positioning equipment.

In some embodiments, the rotor of the motor further includes the end plate 300, the end plate 300 is in the ring-like shape and arranged coaxially with and spaced apart from the supporting ring 220 of the rotor support 200, and the supporting ring 220 and the end plate 300 are respectively arranged at two ends of the magnetic yoke 100 in the axial direction. At least one of the magnetic yoke 100, the supporting ring 220 and the end plate 300 may have the structure divided into the plurality of segments in the circumference direction, so that at least one of the magnetic yoke 100, the supporting ring 220 and the end plate 300 can be divided into the plurality of segment units. For example, each of the magnetic yoke 100, the supporting ring 220 and the end plate 300 has the structure divided into the plurality of segments in the circumference direction, so that each of the magnetic yoke 100, the supporting ring 220 and the end plate 300 can be divided into the plurality of segment units. When a certain segment unit fails, it is only necessary to replace the faulty segment unit with a corresponding new segment unit to achieve repairing the rotor of the motor, thereby saving the maintenance cost of the rotor of the motor.

The wind-power electric generator set is further provided by the embodiment of the present disclosure, including an impeller, and the motor according to any one of the embodiments as described above; the rotation shaft of the motor is coaxially connected with the impeller, so that the impeller drives the rotation shaft of the motor to rotate when the impeller rotates in the wind.

The impeller may include a hub and a plurality of blades connected to the hub. The wind-power electric generator set also includes the tower column and a nacelle arranged on the tower column. The motor also includes the fixed shaft, the stator and the rotor assembly. The fixed shaft is arranged and fixed in the nacelle of the wind-power electric generator set, and the rotation shaft is coaxially connected with the fixed shaft through the bearing. The stator is coaxially fixed with the fixed shaft, and the stator may include a stator core and a stator winding set. The rotor assembly is coaxially connected with the rotation shaft, the rotor assembly may include the rotor of the motor according to any one of the embodiments as described above. The rotor support 200 of the rotor of the motor is connected to the rotation shaft and can rotate with the rotation shaft relative to the stator. The magnet is arranged on the circumference surface of the magnetic yoke 100 of the rotor of the motor.

According to the wind-power electric generator set in the embodiments of the present disclosure, the rotor of the motor includes the rotor support 200 and the magnetic yoke 100; at least one of the magnetic yoke 100 and the supporting ring 220 of the rotor support 200 has the structure divided into the plurality of segments in the circumference direction of itself, so that the magnetic yoke 100 and/or supporting ring 220 can be split into the plurality of segment units; when needed, the plurality of segment units can be spliced to each other to obtain the complete rotor support 200 and the complete magnetic yoke 100, further to obtain the complete rotor structure. Since the magnetic yoke 100 and/or the supporting ring 220 can be disassembled, the volume of the plurality of segment units can be significantly smaller than the volume of the overall rotor, which is convenient for the transportation and store of the rotor while ensuring that the complete rotor can meet the power requirement. Especially for the rotors of large-volume motors such as the high-power direct-driven permanent-magnet wind-power electric generator etc., the transportation cost can be reduced. When the rotor of the motor of the wind-power electric generator needs to be maintained, the repair can be achieved by replacing the segment unit in the faulty part, thereby reducing the maintenance cost of the wind-power electric generator set.

According to the above-mentioned embodiments of the present disclosure, these embodiments do not describe all the details in detail, nor do they limit the present disclosure to only the specific embodiments described. Obviously, according to the above description, many modifications and changes can be made. This description selects and specifically describes these embodiments in order to better explain the principles and practical applications of the present disclosure, so that those skilled in the art can make good use of the present disclosure and make modifications based on the present disclosure. The present disclosure is only limited by the claims and their full scope and equivalents.

What is claimed is:

1. A rotor of a motor, comprising
   a magnetic yoke, wherein the magnetic yoke is in a cylindrical-like shape, and the magnetic yoke is configured to fix a magnet on its circumference surface; and
   a rotor support, comprising a shaft connection unit and a supporting ring, wherein the shaft connection unit is coaxially connected to a rotation shaft of the motor, the supporting ring is arranged on an outer periphery of the shaft connection unit, and the magnetic yoke is arranged to be coaxially connected to the supporting ring;
   wherein at least one of the magnetic yoke or the supporting ring of the rotor support has a structure divided into a plurality of segments in a circumference direction of itself;
   the supporting ring has the structure divided into the plurality of segments in the circumference direction of itself, the supporting ring comprises a plurality of supporting plates, the plurality of the supporting plates are successively spliced into an annular sheet-like body in the circumference direction, each supporting plate is provided with a first connection portion, the shaft connection unit is provided at its outer periphery with a second connection portion, and the plurality of supporting plates are connected to the second connection portion of the shaft connection unit through the first connection portions;
   the supporting plate extends in an arc-like direction, and has two opposite ends in the extending arc-like direction, the first connection portions are arranged at two ends of each the supporting plate;
   two first connection portions of two adjacent supporting plates at a same splicing position are correspondingly connected to one second connection portion of the shaft connection unit; one of the two first connection portions is integral with one of the two adjacent supporting plates, and the other first connection portion is integral with the other of the two adjacent supporting plates;
each first connection portion is a convex connection portion, each second connection portion is a concave connection portion, and the concave connection portion simultaneously matches with the two first connection portions at the same splicing position in shape.

2. The rotor of the motor according to claim 1, wherein at least one slot is formed on a surface of one of the first connection portion and the second connection portion facing to another of the first connection portion and the second connection portion, a pair of wedges opposite to each other are inserted and arranged in each slot.

3. The rotor of the motor according to claim 1, further comprising:
an end plate, wherein the end plate is in a ring-like shape and arranged coaxially with and spaced apart from the supporting ring,
wherein the supporting ring and the end plate are respectively arranged at two ends of the magnetic yoke in an axial direction.

4. The rotor of the motor according to claim 3, wherein the supporting ring has the structure divided into the plurality of segments in a circumference direction of itself, the supporting ring comprises a plurality of supporting plates, the plurality of the supporting plates are successively spliced into an annular sheet-like body in the circumference direction, the adjacent supporting plates are connected by a connection assembly;
and/or the magnetic yoke has the structure divided into the plurality of segments in the circumference direction of itself, the magnetic yoke comprises a plurality of magnetic yoke segments, the plurality of magnetic yoke segments are successively spliced into a cylindrical-like body in the circumference direction, the adjacent magnetic yoke segments are connected by a connection assembly;
and/or the end plate has the structure divided into the plurality of segments in the circumference direction of itself, the end plate comprises a plurality of end plate segments, the plurality of end plate segments are successively spliced into a annular sheet-like body in the circumference direction, the adjacent end plate segments are connected by a connection assembly;
the adjacent supporting plates, and/or the adjacent magnetic yoke segments, and/or the adjacent end plate segments form a first pin hole at a splicing position;
the connection assembly comprises:
a connection base plate, for connecting with the adjacent supporting plates, and/or connecting with the adjacent magnetic yoke segments, and/or connecting with the adjacent end plate segments, wherein the connection base plate is provided with a second pin hole corresponding to a position of the first pin hole; and
a pin block, connecting the second pin hole with the first pin hole, and being fixed to the connection base plate.

5. The rotor of the motor according to claim 4, wherein at each splicing position between the adjacent supporting plates, or between the adjacent magnetic yoke segments, or between the adjacent end plate segments there is a first connection hole; the connection base plate is provided with a second connection hole corresponding to a position of the first connection hole;

the second connection hole of the connection base plate is connected and fixed to the corresponding first connection hole by a first screw bolt penetrating through a first gasket.

6. The rotor of the motor according to claim 4, wherein the connection base plate is provided with a third connection hole around a periphery of the second pin hole; the pin block is in a stepped cylindrical-like shape and is provided with a fourth connection hole corresponding to a position of the third connection hole; the third connection hole of the pin block is connected and fixed to the fourth connection hole of the connection base plate by a second screw bolt penetrating through a second gasket.

7. The rotor of the motor according to claim 3, wherein the supporting ring has the structure divided into plurality of segments in the circumference direction of itself, and comprises a plurality of supporting plates, the plurality of supporting plates are successively spliced into an annular sheet-like body in the circumference direction, a first splicing surface is formed between the adjacent supporting plates;
the magnetic yoke has the structure divided into the plurality of segments in the circumference direction of itself, the magnetic yoke comprises a plurality of magnetic yoke segments, the plurality of magnetic yoke segments are successively spliced into a cylindrical-like body in the circumference direction, a second splicing surface is formed between the adjacent magnetic yoke segments;
the end plate has the structure divided into the plurality of segments in the circumference direction of itself, the end plate comprises a plurality of end plate segments, the plurality of end plate segments are successively spliced into a annular sheet-like body in the circumference direction, a third splicing surface is formed between the adjacent end plate segments;
wherein at least two of the first splicing surface, the second splicing surface and the third splicing surface are arranged to be staggered to each other;
wherein the rotor of the motor further comprises a sealant covering at least one of the first splicing surface, the second splicing surface or the third splicing surface.

8. The rotor of the motor according to claim 1, wherein the supporting ring has the structure divided into a plurality of segments in the circumference direction of itself, and comprises a plurality of supporting plates, the plurality of supporting plates are successively spliced into an annular sheet-like body in the circumference direction; the magnetic yoke has the structure divided into the plurality of segments in the circumference direction of itself, the magnetic yoke comprises a plurality of magnetic yoke segments, the plurality of magnetic yoke segments are successively spliced into a cylindrical-like body in the circumference direction,
wherein the number of the magnetic yoke segments is any positive integer multiple of the number of the supporting plates.

9. The rotor of the motor according to claim 1, wherein the shaft connection unit comprises a central connection portion and a plurality of connection arms radiatively distributed on an outer periphery of the central connection portion; the central connection portion is provided with a through hole matching with the rotation shaft of the motor, and the plurality of the connection arms are connected to the supporting ring;
wherein the central connection portion is connected to the rotation shaft of the motor through a connection flange coaxially arranged to the central connection portion.

10. The rotor of the motor according to claim 9, wherein a space between the central connection portion and the supporting ring is divided into a plurality of hollow areas by the plurality of connection arms, the rotor of the motor further comprises:
  a cover plate, wherein the cover plate is arranged to cover the hollow areas.

11. The rotor of the motor according to claim 9, wherein a space between the central connection portion and the supporting ring is divided into a plurality of hollow areas by the plurality of connection arms,
  the rotor of the motor further comprises:
  a filter unit, wherein the filter unit is arranged in the hollow area.

12. A method for maintaining the rotor of the motor according to claim 1 comprising:
  detecting the rotor of the motor and identifying a defective segment unit;
  separating the defective segment unit from the rotor of the motor so that the rotor of the motor has an area to be filled; and
  installing a non-defective segment unit having a same function as the defective segment unit into the area to be filled of the rotor of the motor to obtain the repaired rotor of the motor.

13. The method for maintaining the rotor of the motor according to claim 12, wherein the rotor of the motor further comprises an end plate, at least one of the magnetic yoke, the supporting ring or the end plate has the structure divided into the plurality of segments in the circumference direction of itself, so that at least one of the magnetic yoke, the supporting ring or the end plate is configured to be divided into the plurality of segment units.

14. A motor, comprising:
  a fixed shaft;
  a rotation shaft, coaxially connected to the fixed shaft through a bearing, and the rotation shaft is adapted to rotate;
  a stator, coaxially fixed to the fixed shaft; and
  a rotor assembly, coaxially connected to the rotation shaft;
  wherein the rotor assembly comprises the rotor of the motor according to claim 1, and the rotor support of the rotor of the motor is connected to the rotation shaft and is adapted to rotate with the rotation shaft relative to the stator, a magnet is arranged on the circumference surface of the magnetic yoke of the rotor of the motor.

15. A wind-power electric generator set, comprising:
  an impeller, and
  the motor according to claim 14, wherein the rotation shaft of the motor is coaxially connected with the impeller.

* * * * *